US009343781B2

(12) United States Patent
Shrader et al.

(10) Patent No.: US 9,343,781 B2
(45) Date of Patent: May 17, 2016

(54) ADAPTIVE CURRENT-COLLECTOR ELECTROCHEMICAL SYSTEM

(71) Applicant: Palo Alto Research Center Incorporated, Palo Alto, CA (US)

(72) Inventors: Eric J. Shrader, Belmont, CA (US); Robert Sean McHenry, Burlingame, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 197 days.

(21) Appl. No.: 14/066,639

(22) Filed: Oct. 29, 2013

(65) Prior Publication Data
US 2015/0118523 A1    Apr. 30, 2015

(51) Int. Cl.
*H01M 2/20* (2006.01)
*H01M 10/42* (2006.01)
*H01M 10/04* (2006.01)
*H01M 10/0585* (2010.01)
*H01M 10/48* (2006.01)
*H01M 10/625* (2014.01)
(Continued)

(52) U.S. Cl.
CPC ............ *H01M 10/425* (2013.01); *H01M 2/202* (2013.01); *H01M 10/0413* (2013.01); *H01M 10/0585* (2013.01); *H01M 10/4257* (2013.01); *H01M 10/48* (2013.01); *H01M 10/617* (2015.04); *H01M 10/625* (2015.04); *H01M 10/637* (2015.04); *H01M 4/72* (2013.01); *H01M 6/42* (2013.01); *H01M 2010/4271* (2013.01); *H01M 2220/20* (2013.01)

(58) Field of Classification Search
CPC .......... H01M 2/202; H01M 4/72; H01M 6/42

USPC ........................................................ 429/50
See application file for complete search history.

(56) References Cited

U.S. PATENT DOCUMENTS 5,949,219 A    9/1999  Weiss
6,451,463 B1 *  9/2002  Tsai et al. ......................... 429/9
(Continued)

OTHER PUBLICATIONS

Cao-Paz et al. "A Multi-Point Sensor Based on Optical Fiber for the Measurement of Electrolyte Density in Lead-Acid Batteries", Sensors 2010, 10, pp. 2587-2608.
(Continued)

*Primary Examiner* — Basia Ridley
*Assistant Examiner* — James Erwin
(74) *Attorney, Agent, or Firm* — Bever, Hoffman & Harms, LLP

(57) ABSTRACT

An Adaptive Current-collector Electrochemical (ACE) system utilizes an array of contact pads and associated current control transistors to control localized current generation in discrete regions of a battery. Each contact pad is formed on a battery electrode (anode or cathode) and coupled to an associated discrete battery region, and is connected by an associated transistor to a current collection plate. Sensors are used to monitor operating parameters (e.g., localized current flow and operating temperature) of each discrete battery region, and a control circuit uses the sensor data to control the operating state of the transistors, whereby localized current flow through each transistor is increased, decreased or turned off according to measured local operating parameters. The control circuit utilizes local control circuits that process local sensor data using "stand-alone" control logic, or a central controller that processes all sensor data and coordinates transistor operations.

20 Claims, 7 Drawing Sheets

(51) Int. Cl.
H01M 10/637 (2014.01)
H01M 10/617 (2014.01)
H01M 4/72 (2006.01)
H01M 6/42 (2006.01)

(56) References Cited

U.S. PATENT DOCUMENTS

| | | |
|---|---|---|
| 7,155,075 B2 | 12/2006 | Rajendran et al. |
| 7,310,153 B2 | 12/2007 | Kiesel et al. |
| 7,315,667 B2 | 1/2008 | Schmidt et al. |
| 7,433,552 B2 | 10/2008 | Kiesel et al. |
| 7,511,823 B2 | 3/2009 | Schultz et al. |
| 7,522,786 B2 | 4/2009 | Kiesel et al. |
| 7,701,590 B2 | 4/2010 | Kiesel et al. |
| 7,718,948 B2 | 5/2010 | Kiesel et al. |
| 7,766,544 B2 | 8/2010 | Shibuya et al. |
| 8,437,582 B2 | 5/2013 | Kiesel et al. |
| 8,594,470 B2 | 11/2013 | Kiesel et al. |
| 2009/0027009 A1 | 1/2009 | Sivertsen |
| 2009/0220189 A1 | 9/2009 | Kiesel et al. |

OTHER PUBLICATIONS

Chehura et al. "Temperature and strain discrimination using a single tilted fibre Bragg grating", Opt. Commun., vol. 275, No. 2, Jul. 2007, pp. 344-347.
Corbellini et al. "Modified POF Sensor for Gaseous Hydrogen Fluoride Monitoring in the Presence of Ionizing Radiations", IEEE Transactions on Instrumentation and Measurement, vol. 61, No. 5, May 2012, pp. 1201-1208.
Grobnic et al. "Sapphire Fiber Bragg Grating Sensor Made Using Femtosecond Laser Radiation for Ultrahigh Technology Applications", Letters, vol. 16, No. 11, Nov. 2004, pp. 2505-2507.
Guan et al. "Simultaneous strain and temperature measurement using a single fibre Bragg grating", Electron. Lett., vol. 36, No. 12, 2000, pp. 1018-1019.
Haase: "Strain Sensors Based on Bragg Gratings", IMEKO 20th TC3, 3rd TC16 and 1st TC22 International Conference Cultivating Metrological Knowledge, Nov. 27, 2007, 8 pages, Available online: http://www.micronoptics.com/uploads/library/documents/sensing_documents/StrainsensorsbasedBragggratings.pdf.
Jansen et al. "Low-Cost Flexible Packaging for High-Power Li-Ion HEV Batteries", FreedomCar & Vehicle Technologies Office, Jun. 2004, 56 pages.
Jin et al. "Geometric representation of errors in measurements of strain and temperature", Opt. Eng., vol. 36, No. 8, 1997, pp. 2272-2278.
Jin et al. "Simultaneous measurement of strain and temperature: error analysis", Opt. Eng., vol. 36, No. 2, 1997, pp. 598-609.
Juergens et al. "Performance Evaluation of Fiber Bragg Gratings at Elevated Temperatures", NASA, Jan. 2004, 14 pages.
Kersey et al. "Fiber Grating Sensors", Journal of Lightwave Technology, vol. 15, No. 8, Aug. 1997, pp. 1442-1463.
Klein et al. "Optimal Charging Strategies in Lithium-Ion Battery", American Control Conference (ACC), Jun. 2011, pp. 382-387.
Kumai et al. "Gas Generation Mechanism Due to electrolyte Decomposition in Commercial Lithium-Ion Cell", Journal of Power Sources, 81-82, 1999, pp. 715-719.
Lee et al. "In Situ Monitoring of Temperature Inside Lithium-Ion Batteries by Flexible Micro Temperature Sensors", Sensors 2011, 11, pp. 9942-9950.
Liang et al. "Highly Sensitive Fiber Bragg Grating Refractive Index Sensors", Applied Physics Letters, vol. 86, 2005, pp. 151122-1-151122-3.
Merzbacher et al. "Fiber Optic Sensors in Concrete Structures: A Review", Smart Mater. Struct., 5, 1996, pp. 196-208.
Micron Optics, "Optical Fiber Sensors Gide", 21 pages [Date Unknown].
Patrick et al. "Hybrid fiber Bragg grating/long period fiber grating sensor for strain/temperature discrimination", IEEE Photonics Technol. Lett., vol. 8, No. 9, 1996, pp. 1223-1225.
Qi et al. "In Situ Observation of Strains During Lithiation of a Graphite Electrode", Journal of the Electrochemical Society, vol. 157 (6), 2010, pp. A741-A747.
Qin et al. "Specific Fluorescence Determination of Lithium Ion Based on 2-(2-hydroxyphenyl)benzoxazole", The Royal Society of Chemistry, 2001, pp. 1499-1501.
Rao: "In-fibre Bragg grating sensors", Meas. Sci. Technol., vol. 8, No. 4, Apr. 1997, pp. 355-375.
Reimers et al. "Electrochemical and In Situ X-Ray Diffraction Studies of Lithium Intercalation in $Li_xCoO_2$", Journal of The Electrochemical Society, 139 (8), 1992.
Rodrigues et al. "A Review of State-of-Charge Indication of Batteries by Means of A.C. Impedance Measurements", Journal of Power Sources, vol. 87, 2000, pp. 12-20.
Saha et al. "Battery Data Set", NASA Ames Prognostics Data Repository, 2007, Available online: http://ti.arc.nasa.gov/tech/dash/pcoe/prognostic-data-repository/.
Sang et al. "Temperature-Insensitive Chemical Sensor Based on a Fiber Bragg Grating", Sensors and Actuators B 120, 2007, pp. 754-757.
Sethuramaman et al. "Surface structural disordering in graphite upon lithium intercalation/deintercalation", Journal of Power Sources 195 (2010) 3655-3660.
Siegel et al. "Neutron Imaging of Lithium Concentration in FLP Pouch Cell Battery", Journal of the Electrochemical Society, 158 (6), 2011, 8 pages.
Smith et al. "Power and Thermal Characterization of Lithium-Ion Battery Pack for Hybrid-Electric Vehicles", Journal of Power Sources, 160 (1), 2006, pp. 662-673.
Tang et al. "Measurement of Chloride-Ion Concentration with Long-Period Grating Technology", Smart Mater. Struct. vol. 16, 2007, pp. 665-672.
Triollet et al. "Discriminated measures of strain and temperature in metallic specimen with embedded superimposed long and short fibre Bragg gratings", Meas. Sci. Technol., vol. 22, No. 1, Jan. 2011, pp. 015202.
Udo et al. "Fiber Optic Distributed Sensing Systems for Harsh Aerospace Enviroments", Proc. SPIE 3674, Smart Structures and Materials 1999: Industrial and Commercial Applications of Smart Structures Technologies, 136 (Jul. 9, 1999) 12 pages.
Van Steenkiste et al. "Strain and Temperature Measurement with Fiber Optic Sensors", 1997, 9 pages.
Wang et al. "Simultaneous measurement of strain and temperature using dual-period fiber grating", Proc. SPIE, vol. 4579, 2001, pp. 265-268.
Wang et al. "Understanding Volume Change in Lithium-Ion Cells during Charging and Discharging Using In Situ Measurements", Journal of The Electrochemical Society, 154 (1), 2007.
Xu et al. "Discrimination between strain and temperature effects using dual-wavelength fibre grating sensors", Electron. Lett., vol. 30, No. 13, pp. 1085-1087, 1994.
Zhao et al. "Discrimination methods and demodulation techniques for Bragg grating sensors", Opt. Lasers Eng., vol. 41, No. 1, pp. 1-18, Jan. 2004.
Zhou et al. "Simultaneous measurement for strain and temperature using fiber Bragg gratings and multimode fibers", Appl. Opt., vol. 47, No. 10, Apr. 2008, pp. 1668-1672.

* cited by examiner

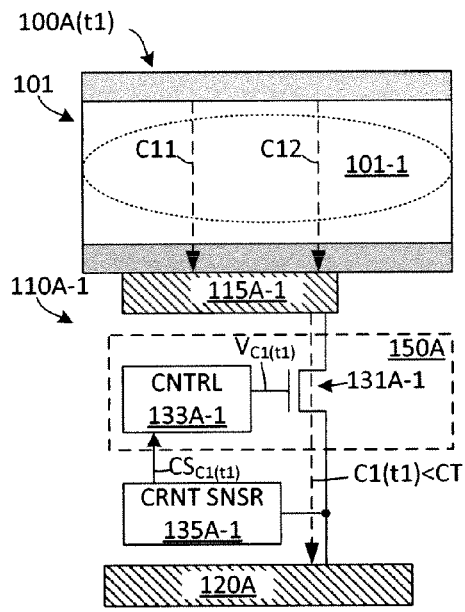
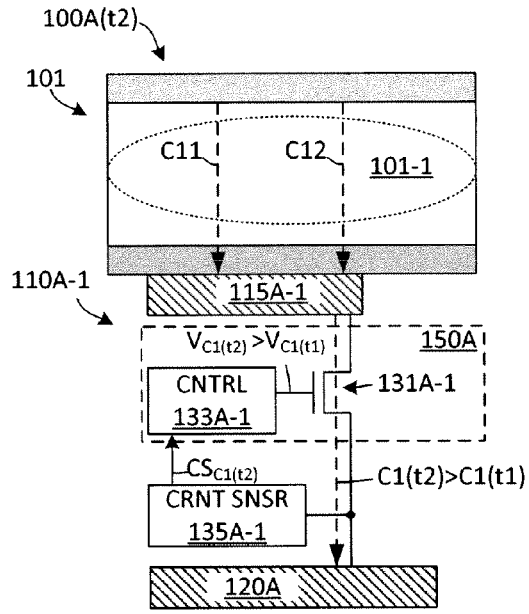
FIG. 2(A)        FIG. 2(B)
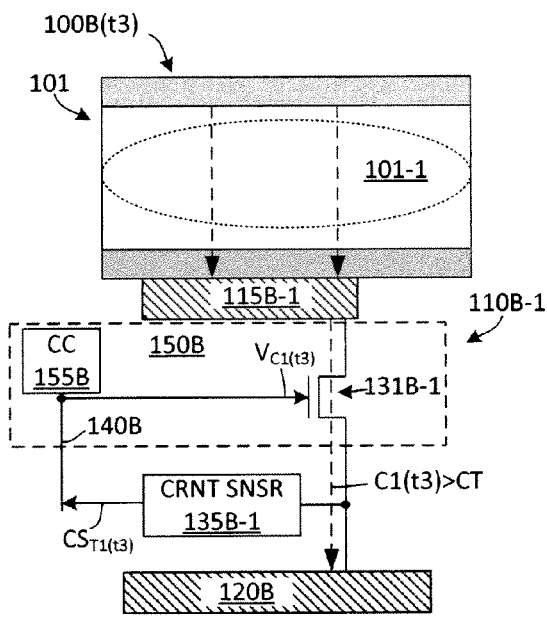
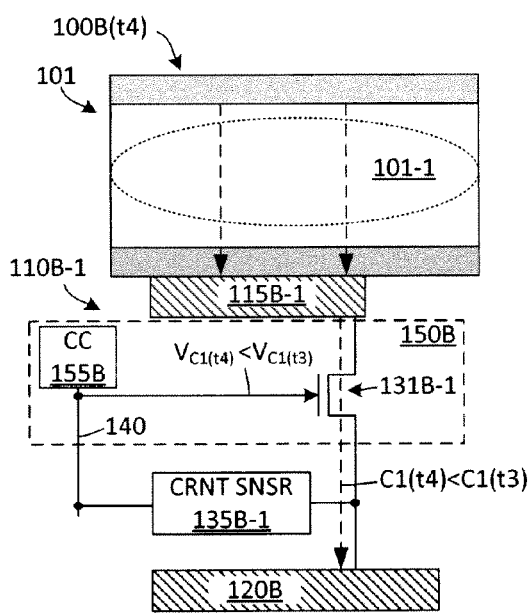
FIG. 3(A)        FIG. 3(B)

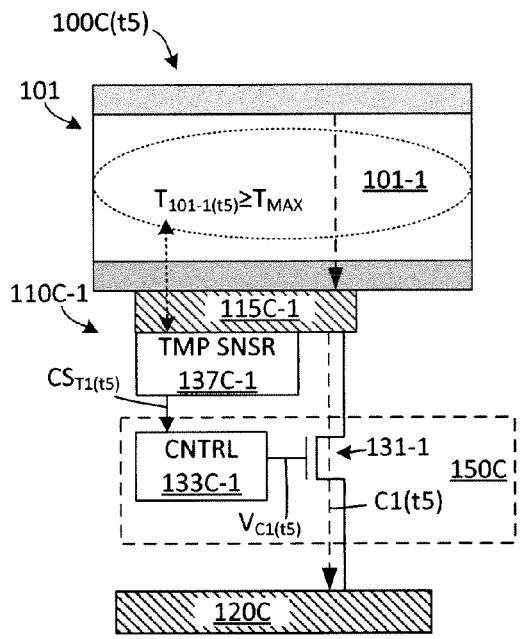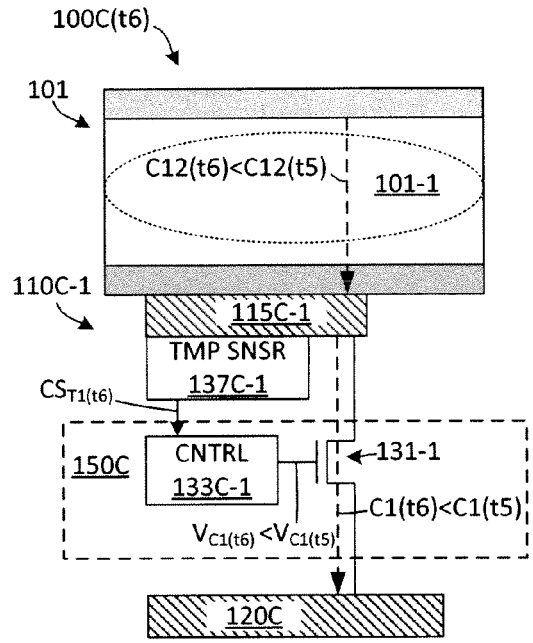
FIG. 4(A)  FIG. 4(B)
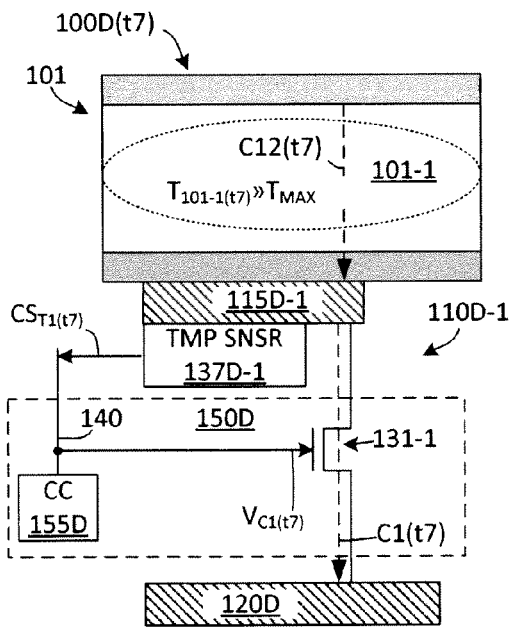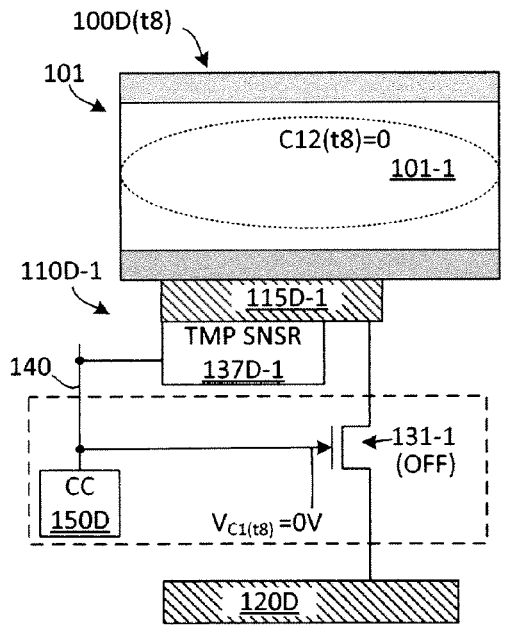
FIG. 5(A)  FIG. 5(B)

ADAPTIVE CURRENT-COLLECTOR ELECTROCHEMICAL SYSTEM

FIELD OF THE INVENTION

This invention relates to batteries, and in particular to battery control systems.

BACKGROUND OF THE INVENTION

A battery requires the concentration of energy in order to serve its purpose, and the uncontrolled release of concentrated energy poses an inherent safety risk. In electric vehicles (EVs), for example, the battery system design is driven by the spiraling mitigation of this risk—from lower energy battery chemistry selection, to embedded cell safety elements, to reduced packing density, to battery management system (BMS) monitoring and safety circuits, to vehicle structural protection. These mitigation layers have been only partially successful in preventing catastrophic battery events, and come at the price of increased cost and weight that directly limit EV commercial viability. While more efficient mitigation approaches may be possible, in order to break out of this spiral and achieve the full potential of EVs, battery cells must be made to be self-sufficient with intrinsic mitigation of their inherent risks.

SUMMARY OF THE INVENTION

The present invention is directed to a battery assembly including a battery and an Adaptive Current-collector Electrochemical (ACE) system that controls battery operation (i.e., current flow between the battery and a load circuit) by controlling the generation of localized current flow in discrete regions of the battery.

According to a first aspect of the present invention, the ACE system utilizes spaced-apart contact pads that are attached to one of the battery's electrodes (i.e., either the anode or the cathode) in a way that couples each contact pad to an associated battery region (i.e., such that substantially all of the localized battery current generated in a particular discrete battery region flows through one associated contact pad). By providing the spaced-apart contact pads in this manner, the present invention facilitates individual control over localized current flows in each battery region.

According to a second aspect of the present invention, the ACE system includes an array of transistors and associated control circuitry that individually control current flows between the contact pads and a current collection plate (substrate). Each transistor has a first (e.g., drain or emitter) terminal connected to an associated contact pad, a second (e.g., source or collector) terminal connected to the current collection substrate, and a control (e.g., gate or base) terminal that receives an associated control voltage transmitted from the control circuit. By adjusting (i.e., increasing or decreasing) the control voltage applied to each transistor, the ACE system controls the localized current portion flowing from each contact pad to the current collection substrate. Because the current flowing through each contact pad is derived from only one discrete battery region, this arrangement facilitates localized control over battery operations. Specifically, the amount of localized battery current generated a particular discrete battery region is increased, decreased or turned off by controlling the operating state of the transistor coupled to that particular discrete battery region by way of an associated contact pad. The present invention thus provides self-sufficient battery management that both optimizes battery operation and prevents a local failure in one battery region from producing a catastrophic total battery failure by allowing the local failed battery region to be turned off.

According to a third aspect of the present invention, the ACE system utilizes an array of sensors to measure one or more localized battery operating parameters in each of the discrete battery regions, and the control circuitry processes the sensor data and controls the transistors in accordance with the measured operating parameters such that battery operations are optimized. In one embodiment, both a current sensor and a temperature sensor are utilized to measure localized operating parameters in each of the discrete battery regions (e.g., an amount of current passing through a particular discrete battery region, and the temperature of the particular discrete battery region), and to generate associated sensor signals having values determined in accordance with these measured localized operating parameters. In a "stand-alone" control circuit embodiment, multiple "local" control circuits are utilized such that each control circuit receives sensor signals generated for only one associated discrete battery region, compares the sensor signals with stored target values, and generates an associated transistor control voltage that controls an associated current control transistor. A benefit of this "stand-alone" control logic scheme is that this approach facilitates a cost-effective scalable battery control system that can be used for batteries of many sizes without the use of additional interconnect wiring or electronics. In a "central control" embodiment, a central controller receives and processes data from all of the sensors, and transmits associated transistor control voltages to each current control transistors. Although the "central controller" embodiment requires additional overhead (e.g., bus lines) that limit scalability, this approach facilitates coordinated battery control strategies that cannot be achieved using the stand-alone approach, such as increasing current generation in healthy battery regions while decreasing current generation in failed or problematic battery regions to maintain optimal battery output.

BRIEF DESCRIPTION OF THE DRAWINGS

These and other features, aspects and advantages of the present invention will become better understood with regard to the following description, appended claims, and accompanying drawings, where:

FIGS. 2(A) and 2(B) are partial views showing a battery assembly including an ACE system according to another embodiment of the present invention;

FIGS. 3(A) and 3(B) are partial views showing a battery assembly including an ACE system according to another embodiment of the present invention;

FIGS. 4(A) and 4(B) are partial views showing a battery assembly including an ACE system according to another embodiment of the present invention;

FIGS. 5(A) and 5(B) are partial views showing a battery assembly including an ACE system according to another embodiment of the present invention;

DETAILED DESCRIPTION OF THE DRAWINGS

The present invention relates to an improvement in battery control systems. The following description is presented to enable one of ordinary skill in the art to make and use the invention as provided in the context of a particular application and its requirements. As used herein, directional terms such as "upper", and "over" are intended to provide relative positions for purposes of description, and are not intended to designate an absolute frame of reference. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor) or by inductance. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
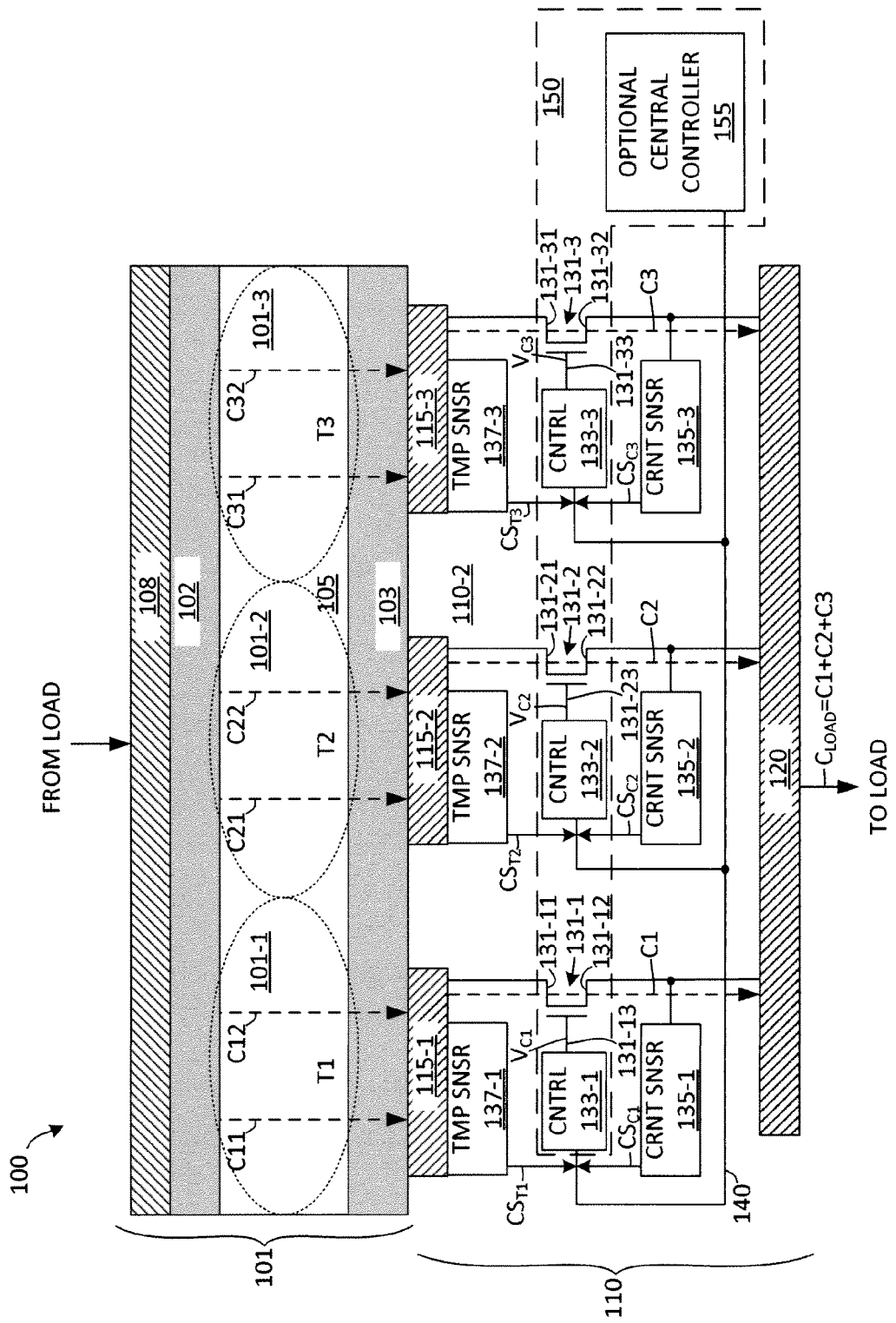
FIG. 1 is a simplified diagram showing a battery assembly including an ACE system according to an embodiment of the present invention.

FIG. 1 depicts a battery assembly 100 for supplying a load current $C_{LOAD}$ to an external load (not shown) according to a generalized embodiment of the present invention, where battery assembly 100 generally includes a battery 101 and an Adaptive Current-collector Electrochemical (ACE) system 110.

Referring to the upper portion of FIG. 1, battery 101 is depicted in a generalized form (and not to scale) as including an anode 102, a cathode 103, an electrolyte region 105 and an upper current collection plate 106 that function to generate localized currents C11 to C32 between anode 102 and cathode 103, where each of the localized currents is generated between anode 102 and cathode 103 in an associated region of battery 101. Battery 101 is not limited to a particular battery type, but is preferably rechargeable (e.g., lithium-ion and sub types, e.g., Li—NMC Li—NCA, Li—FePO$_4$, nickel-metal hydride or zinc-bromide). In addition, battery 101 is characterized by having a relatively large electrode contact area configuration (i.e., such that a width W of anode 102 and cathode 103 is substantially larger than a thickness T of battery 101, where anode 102 and cathode 103 comprise continuous (without physical segregation) structures over the entire electrode contact area). As explained below, the large contact area configuration facilitates control over discrete battery regions 101-1, 101-2 and 101-3, which are generally depicted by dashed-line ovals. During operation, electrical current (depicted by two dashed-line arrows) is generated or otherwise flows between anode 102 and cathode 103 according to known battery technology. For descriptive purposes, the localized currents in each battery region 101-1 to 101-3 are identified by two dashed-line arrows that pass through an associated dashed-line oval (e.g., localized currents C 11 and C12 are generated in associated battery region 101-1, localized currents C21 and C22 are generated in associated battery region 101-2, and localized currents C31 and C32 are generated in associated battery region 101-3). The depiction of localized currents using two dashed-line arrows in each battery region is intended solely to indicate that current is generated in substantially all portions of each battery region.

According to a first aspect of the present invention, ACE system 110 includes spaced-apart contact pads (current collectors) 115-1, 115-2 and 115-3 that are attached to an electrode of battery 101 in a way that couples each contact pad 115-1 to 115-3 to an associated battery region 101-1 to 101-3. In the embodiment shown in FIG. 1, contact pads 115-1 to 115-3 are conductive (e.g., aluminum or other metal) structures that are disposed on (i.e., operably connected to) cathode 103 and arranged a spaced-apart configuration such that associated localized currents generated in battery regions 101-1 to 101-3 flow through contact pads 115-1 to 115-3, respectively. Specifically, contact pad 115-1 is disposed on a portion of cathode 103 under discrete battery region 101-1 such that localized current portions C11 and C12 are received by (i.e., flow through) contact pad 115-1. Similarly, contact pad 115-2 is disposed under discrete battery region 101-2 such that contact pad 115-2 receives localized current portions C21 and C22, and contact pad 115-3 is disposed under discrete battery region 101-3 such that contact pad 115-3 receives localized current portions C31 and C32. Note that battery 101 is configured such that cathode 103, which typically comprises a material that is less conductive than the current collector pads, resists or prevents the flow of current between the spaced-apart contact pads (e.g., between contact pads 115-1 and 115-2, and between contact pads 115-2 and 115-3). As such, localized battery currents generated in each battery region 101-1 to 101-3 respectively substantially entirely flow only through one associated contact pad 115-1 to 115-3. As used herein, "substantially entirely" means that current portions generated in the peripheral boundary areas of the battery regions may flow to either of two adjacent contact pads, but that all current portions generated in the interior areas of each battery region flow to only one contact pad). Note also that, although contact pads 115-1 to 115-3 are depicted as being connected to cathode 103 (i.e., such that current flows from battery 101 to the load through contact pads 115-1 to 115-3), it is also possible to attached ACE system 110 to battery 101 such that contact pads 115-1 to 115-3 are connected to anode 102 (i.e., such that current flows from the load through contact pads 115-1 to 115-3 to battery 101).

According to another aspect of the present invention, ACE system 110 includes an array of MOSFET transistors 131-1 to 131-3 that are operably connected between a current collection plate (substrate) 120 and contact pads 115-1 to 115-3, respectively. Specifically, transistor 131-1 has a drain (first) terminal 131-11 connected to associated contact pad 115-1, a source (second) terminal 131-12 connected to collection plate 120, and a gate (control) terminal 131-13 that receives an associated control voltage $V_{C1}$. With this arrangement, when transistor 131-1 is turned on by control voltage $V_{C1}$ (e.g., when control voltage $V_{C1}$ is above the threshold voltage of transistor 131-1), a localized current C1 (indicated by the dashed-line arrow passing through transistor 131-1) passes from contact pad 115-1 to collection plate 120, where current C1 has a current amount determined by (i.e., proportional to) the voltage level of control voltage $V_{C1}$. Similarly, transistor 131-2 has a drain terminal 131-21 connected to contact pad 115-2, a source terminal 131-22 connected to current collection substrate 120, and a gate terminal 131-23 that receives control voltage $V_{C2}$, and transistor 131-3 has a drain terminal 131-31 connected to contact pad 115-3, a source terminal 131-32 connected to current collection substrate 120, and a gate terminal 131-33 that receives control voltage $V_{C3}$. Control voltages $V_{C1}$ and $V_{C2}$ respectively control transistors 131-2 and 131-3 to generate localized currents C2 and C3 from contact pads 115-2 and 115-3 to collection plate 120. Collection plate 120 is implemented by a sheet of metal or other conductive material that facilitates the combination of localized currents C1 to C3 such that the sum of these currents form load current $C_{LOAD}$.

ACE system 110 facilitates individual control over localized battery currents generated in discrete battery regions 101-1 to 101-3 by individually adjusting the operating states of transistors 131-1 to 131-3, respectively. That is, because current portion C1 flowing through contact pad 115-1 is derived only from discrete battery region 101-1, localized control over localized currents C11 and C12 in discrete battery region 101-1 is achieved by adjusting (i.e., increasing or decreasing) control voltage $V_{C1}$, whereby the operating state of transistor 131-1 is adjusted. For example, the current flow amount associated with localized currents C11 and C12 in battery region 101-1 is effectively decreased by way of decreasing current portion C 1 through transistor 131-1, which is achieved by decreasing control voltage $V_{C1}$. Conversely, the amount of localized currents C11 and C12 in battery region 101-1 is effectively increased by increasing control voltage $V_{C1}$. In a similar manner, localized control over discrete battery regions 101-2 and 101-3 is achieved by way of control voltages $V_{C2}$ and $V_{C3}$.

According to a third aspect of the present invention, ACE system 110 utilizes one or more components (e.g., current sensors 135-1 to 135-3 and/or temperature sensors 137-1 to 137-3) to measure localized battery operating parameters in discrete battery regions 101-1 to 101-3, and utilizes control circuitry 150 to control the operating states of transistors 131-1 to 131-3 in accordance with the measured operating parameters (i.e., to process the data associated with the measured operating parameters, and to generate control voltages $V_{C1}$, $V_{C2}$ and $V_{C3}$ in accordance with the processed data). In addition to current and temperature sensors, other components (e.g., voltage ers or chemical sensors) may be used to measure localized battery operating parameters.

Current sensors 135-1 to 135-3 measure the amount of current generated in discrete battery regions 101-1 to 101-3 by measuring current portions C1 to C3 passing through transistors 131-1 to 131-3 using known current measurement techniques, and generate associated current sensor signals $CS_{C1}$ to $CS_{C3}$ having (data) values determined by (e.g., proportional to) the measured current portions. Specifically, current sensor 135-1 measures current portion C1 flowing between drain terminal 131-11 and source terminal 131-12 of transistor 131-1, which indicates the amount of localized current C11 and C12 generated in discrete battery region 101-1, and generates associated current sensor signal $CS_{C1}$ having an analog or digital data value corresponding to measured current portion C1. Similarly, current sensors 135-2 and 135-3 measure current portions C2 and C3 respectively flowing through transistors 131-2 and 131-3, and generate associated current sensor signals $CS_{C2}$ and $CS_{C3}$. Transmitted current sensor signals $CS_{C2}$ and $CS_{C3}$ include either analog or digital data values, depending on the circuitry included in current sensors 135-1 to 135-3 and the circuitry used to process the current data.

Temperature sensors 137-1 to 137-3 are respectively disposed on contact pads 115-1 to 115-3, and measure local operating temperatures T1 to T3 in discrete battery regions 101-1 to 101-3 using known temperature measuring techniques. Temperature sensors 137-1 to 137-3 are also configured to generate associated temperature sensor signals $CS_{T1}$ to $CS_{T3}$ having (data) values determined by (e.g., proportional to) the measured localized temperatures T1 to T3, respectively. Specifically, temperature sensor 137-1 is mounted on contact pad 115-1 to measure localized temperature T1 generated in discrete battery region 101-1, and generates associated temperature sensor signal $CS_{T1}$, having an analog or digital data value corresponding to measured localized temperature T1. Similarly, temperature sensors 137-2 and 137-3 measure localized temperatures T2 and T3 respectively generated in discrete battery regions 101-2 and 101-3, and generate associated temperature sensor signals $CS_{T2}$ and $CS_{T3}$.

Control circuit 150 is operably configured and fabricated using known techniques to receive and process current sensor signals $CS_{C1}$ to $CS_{C3}$, temperature sensor signals $CS_{T1}$ to $CS_{T3}$, or a combination of current and temperature signals, and to generate control voltages $V_{C1}$, $V_{C2}$ and $V_{C3}$ having voltage levels that are determined by (e.g., proportional to) at least one of the received sensor signals. For example, control circuit 150 generates control voltage $V_{C1}$ such that it's voltage level is proportional to sensor signals $CS_{C1}$ or $CS_{T1}$, or proportional to a calculated value determined by a combination of sensor signals $CS_{C1}$ or $CS_{T1}$, or proportional to a calculated value determined by two or more of current sensor signals $CS_{C1}$ to $CS_{C3}$ and two or more temperature sensor signals $CS_{T1}$ to $CS_{T3}$. As mentioned above, control circuit 150 then applies (transmits) control voltages $V_{C1}$, $V_{C2}$ and $V_{C3}$ onto the control terminal of transistors 131-1 to 131-3, respectively, such that localized current portions C1 to C3 passing from associated said contact pads 115-1 to 115-3 to current collection substrate 120 are determined by (e.g., made proportional to) applied control voltages $V_{C1}$, $V_{C2}$ and $V_{C3}$.

According to alternative specific embodiments of the present invention, control circuit 150 is operably configured to implement a "stand-alone" control logic scheme, a "central controller" control logic scheme, or a combination of these two control logic schemes.

Under the "stand-alone" control logic approach, control circuit 150 includes "local" control circuits 133-1 to 133-3 that are respectively disposed adjacent to discrete battery regions 101-1 to 101-3, where each control circuit 133-1 to 133-3 receives and processes operating parameter data generated for only one associated discrete battery regions 101-1 to 101-3. For example, control circuit 133-1 is connected to current sensor 135-1 and is configured to compare current sensor signal $CS_{C1}$ with a stored target current flow value, and to adjust (generate) control voltage $V_{C1}$ in accordance with a difference between sensor signal $CS_{C1}$ and the stored value. Alternatively, control circuit 133-1 is connected to receive temperature sensor signal $CS_{T1}$ from temperature sensor 137-1, and is configured to adjusting control voltage $V_{C1}$ in accordance with a comparison of temperature sensor signal $CS_{T1}$ to a stored target temperature value. In yet another alternative embodiment, control circuit 133-1 is connected to receive and process both current sensor signal $CS_{C1}$ and temperature sensor signal $CS_{T1}$. At the same time, control circuit 133-2 receives and processes current sensor signal $CS_{C2}$ from current sensor 135-2 and/or temperature sensor signal $CS_{T2}$ from temperature sensor 137-2, and generates transistor control voltage $V_{C2}$ that controls transistor 131-2, and control circuit 133-3 receives and processes current sensor signal $CS_{C3}$ from current sensor 135-3 and/or temperature sensor signal $CS_{T2}$ from temperature sensor 137-3, and generates transistor control voltage $V_{C3}$ that controls transistor 131-3. As described in additional below with reference to the examples described with reference to FIGS. 2(A), 2(B), 4(A) and 4(B), each discrete battery region 101-1 to 101-3 is controlled independently from all other battery regions, where control voltages $V_{C1}$ to $V_{C3}$ are generated solely based on localized battery operating parameters. A benefit of this "stand-alone" arrangement is that this approach facilitates a cost-effective scalable battery control system that can be used for batteries of many sizes without the use of additional interconnect wiring or electronics.

Under the "central control" control logic approach, control circuit 150 includes a central controller 155 that receives the sensor signals generated by all of the sensors 135-1 to 135-3 and 137-1 to 137-3 by way of one or more bus lines 140, processes the associated data provided by the sensor signals, and transmits associated transistor control voltages $V_{C1}$ to $V_{C3}$ to transistors 131-1 to 133-3. As described in additional below with reference to the examples described with reference to FIGS. 3(A), 3(B), 5(A) and 5(B), discrete battery regions 101-1 to 101-3 are collectively controlled based on localized battery operating parameters collected from all battery regions. Although this "central controller" control logic approach requires additional overhead in the form of bus lines 140 that increase manufacturing costs and may limit scalability (e.g., a separately manufactured ACE system may be required for different battery sizes), this approach facilitates coordinated battery control schemes (described below) that cannot be achieved using the "stand-alone" approach.

In other embodiments, a control logic scheme is implemented in which one or more features of the "stand-alone" and "central control" control logic schemes are combined. For example, as described below with reference to FIG. 7, a central controller is utilized to process and generate coordinated control voltage signals that are transmitted to modified "local" control circuits, which generate the transistor control voltages in response to the coordinated control voltage signals. Those skilled in the art will recognize other control logic schemes may also be utilized that fall within the spirit and scope of the present invention.

FIGS. 2(A) and 2(B) are cross-sectional views showing a partial battery assembly 100A including battery region 101-1 of battery 101 (described above) and an associated ACE system portion 110A-1 according to a first exemplary embodiment. In particular, ACE system portion 110A-1 includes a contact pad 115A-1 that is coupled to battery region 101-1 in the manner described above, a transistor 131A-1 that is connected between contact pad 115A-1 and a corresponding portion of current collection substrate 120A, a current sensor 135A-1 for measuring current portion (operating parameter) C1 flowing between transistor 131A-1 and current collection substrate 120A and for generating a corresponding current sensor signal $CS_{C1}$, and a "stand-alone" control circuit 150A including a local control circuit 133A-1 that receives and processes current sensor signal $CS_{C1}$, and generates corresponding control voltage $V_{C1}$ that is applied on the control terminal of transistor 131A-1. FIGS. 2(A) and 2(B) also depict current flows and signals generated in partial battery assembly 100A at two different operating time periods, where FIG. 2(A) shows battery assembly 100A at a first time t1 (designated by "100A(t1)" in the figure), and FIG. 2(B) shows battery assembly 100A at a second time t2, where time t2 occurs after time t1.

Referring to FIG. 2(A), at time t1, local control circuit 133A-1 generates a control voltage $V_{C1(t1)}$ having a voltage level that causes transistor 131A-1 to generate a current portion C1 (t1). At the same time, current sensor 135A-1 measures current portion C1(t1) (which is the equal to the sum of localized currents C11 and C12 in battery region 101-1 at time t1), and transmits a corresponding sensor signal $CS_{C1(t1)}$ to local control circuit 133A-1. Using the "stand-alone" control logic scheme, local control circuit 133A-1 compares sensor signal $CS_{C1(t1)}$ with one or more stored target current flow values CT in order to determine if battery region 101-1 is within a preset target current range, and adjusts (i.e., increases or decreases) control voltage $V_{C1}$, in accordance with this comparison. For purposes of explanation, current portion C1(t1) is deemed lower than the target current range, which is indicated in FIG. 2(A) as "C1(t1)<CT" and indicates that localized currents C11 and C12 are too low. As such, local control circuit 133A-1 reacts by increasing control voltage $V_{C1}$ in order to increase the flow through transistor 131A-1, which in turn causes localized currents C1 and C2 to increase.

Referring to FIG. 2(B), which shows battery assembly 100A at time t2 subsequent to time t1, local control circuit 133A-1 generates adjusted control voltage $V_{C1(t2)}$ having a voltage level that is higher than control voltage $V_{C1(t1)}$ by a predetermined amount, thereby causing transistor 131A-1 to generate a current portion C1(t2) that is higher than current portion C1(t1). Current sensor 135A-1 measures current portion C1(t2) (which is the equal to the sum of localized currents C11 and C12 in battery region 101-1 at time t2), and transmits a corresponding sensor signal $CS_{C1(t2)}$ to local control circuit 133A-1, whereby further adjustment necessary) is made by repeating the process described above with reference to FIG. 2(A).

FIGS. 3(A) and 3(B) are cross-sectional views showing a partial battery assembly 100B including battery region 101-1 of battery 101 and an associated ACE system portion 110B-1 according to a second exemplary embodiment that uses the "central controller" control logic scheme. Similar to the previous embodiment, ACE system portion 110B-1 includes a transistor 131B-1 connected between contact pad 115B-1 and current collection substrate 120B, and a current sensor 135B-1 for measuring current portion C1. ACE system portion 110B-1 differs from the previous embodiment in that control circuit 150B includes a central control (CC) circuit 155B that receives current sensor signals from multiple current sensors (including current sensor signal $CS_{C1}$ received from current sensor 135B-1) by way of bus line (or dedicated signal lines) 140, and generates corresponding control voltages that are applied on the control terminal of associated transistors (e.g., control voltage $V_{C1}$ is transmitted to the gate terminal of transistor 131B-1). Referring to FIG. 3(A), at time t3, local control circuit 133A-1 generates a control voltage $V_{C1(t3)}$ that generates a current portion C1(t1) from battery region 101-1 through transistor 131A-1, which is measured by current sensor 135A-1, which passes corresponding sensor signal $CS_{C1(t3)}$ to central controller 155B by way of line 140. Central controller 155B receives sensor signal $CS_{C1(t3)}$ and sensor signals from other current sensors, processes the sensor signals in accordance with stored logic (e.g., adjusts control voltage $V_{C1}$ based on received first sensor signal $CS_{C1(t3)}$). For purposes of explanation, current portion C1(t3) is deemed higher than the target current range, which is indicated in FIG. 3(A) as "C1(t3)>CT" and indicates that the localized currents in battery region 101-1 are too high. As such, central controller 155B reacts by decreasing the control voltage for transistor 131B-1 in order to decrease the flow through transistor 131B-1, which in turn causes localized currents C1 and 02 to increase. Referring to FIG. 3(B), which shows battery assembly 100A at time t4, local control circuit 133B-1 generates adjusted control voltage $V_{C1(t4)}$ having a voltage level that is lower than control voltage $V_{C1(t3)}$ by a predetermined amount, thereby causing transistor 131B-1 to generate a current portion C1(t4) that is lower than current portion C1(t3).

FIGS. 4(A) and 4(B) illustrate an example in which an over-temperature condition is caused by a minor local fault, the adaptive current collector adjusts current flow to reduce localized temperature. In this embodiment ACE system 100C-1 includes a transistor 131C-1 connected between contact pad 115C-1 and substrate 120C, a temperature sensor 137C-1 for measuring a localized operating temperature (operating parameter) T1 of battery 101 in battery region 101-1, and for generating a corresponding temperature sensor signal $CS_{T1}$, and a "stand-alone" control circuit 150C including a local control circuit 133C-1 that receives and processes temperature sensor signal $CS_{T1}$, and generates corresponding control voltage $V_{C1}$ that is applied on the control terminal of transistor 131C-1. Referring to FIG. 4(A), at time t5, local control circuit 133C-1 generates a control voltage $V_{C1(t5)}$ that produces current portion C1(t5), and temperature sensor 137C-1 measures temperature $T_{101-1(t5)}$, and transmits a corresponding sensor signal $CS_{T1(t5)}$ to local control circuit 133C-1, which compares sensor signal $CS_{T1(t5)}$ with one or more stored target temperature values (e.g., a maximum optimal operating temperature $T_{MAX}$), and adjusts (i.e., increases or decreases) control voltage $V_{C1}$ in accordance with this comparison. For purposes of explanation, temperature $T_{101-1(t5)}$ is deemed higher than the target temperature $T_{MAX}$. Referring to FIG. 4(B), which shows battery assembly 100C at time t6 subsequent to time t5, local control circuit 133C-1 generates adjusted control voltage $V_{C1(t6)}$ having a voltage level that is lower than control voltage $V_{C1(t5)}$ by a predetermined amount, thereby causing transistor 131C-1 to generate a current portion C1(t6) that is lower than current portion C1(t5), whereby the localized temperature subsequent to time t6 is reduced from that measured at time t5.

FIGS. 5(A) and 5(B) illustrate another example in which an over-temperature condition is caused by major adverse condition (e.g., a fire) or major fault that cascades across the cell and represents a safety risk, where the adaptive current collector reacts across all control areas to shutdown the battery. ACE system portion 110D-1 includes a transistor 131D-1 connected between contact pad 115D-1 and current collection substrate 120D, a temperature sensor 137D-1 disposed to measure localized temperature $T_{101-1}$ in region 101-1 of battery 101, where control circuit 150D includes a central control (CC) circuit 155D that receives sensor signals from multiple sensors (including sensor signal $CS_{T1}$ from temperature sensor 137D-1) by way of lines 140, and generates corresponding control voltages that are transmitted over lines 140 to associated transistors (e.g., signal $V_{C1}$ is transmitted to transistor 131D-1). Referring to FIG. 5(A), at time t7 while control voltage $V_{C1(t7)}$ is applied to transistor 131O-1 to produce current portion C1(t7) through battery region 101-1, temperature sensor 1379-1 detects temperature $T_{101-1(t7)}$ and transmits corresponding sensor signal $CS_{T1(t7)}$ to central controller 155B by way of lines 140. As indicated in FIG. 5(B), at time t8 central controller 155B determines from sensor signal $CS_{T1(t7)}$ that temperature $T_{101-1(t7)}$ is much higher than the target temperature $T_{MAX}$, and reacts by deactivating control voltage $V_{C1(t8)}$ (i.e., $V_{C1(t8)}$=0V), thereby terminating current flow C12 through battery region 101-1.

As described above with reference to the examples of FIGS. 2(A)/2(B) and 4(A)/4(B), the adaptive current collector arrangements utilizing "stand-alone" control circuits enable localized control over each battery region when localized currents are lower than or exceed the design threshold (target value), regardless of the cause. If battery 101 has local defects that diminish output by generating an under-current, one or more local control circuits automatically adapt (adjust) their associated control voltage upward (e.g., in the manner control circuit 133A-1 adjusts control voltage $V_{C1}$ upward as described above with reference to FIGS. 2(A) and 2(B)), thereby reducing transistor resistance (i.e., increases transistor conductance) in the defective battery region(s) to promote current generation. Conversely, if battery 101 has local defects that generate an overcurrent condition, then the adaptive current collector arrangement automatically decreases conductivity (increases resistance) to maintain current within the control band, as described with reference to FIGS. 4(A) and 4(B). Further, when one or more measured current portions indicate an impending catastrophic failure (e.g., rapidly increasing current or temperature), the local control circuits automatically adapt by turning off the transistors to terminate current generation inside battery 101 in a manner similar to that described with reference to FIG. 5(B), whereby the release of energy from battery 101 is unable to exceed the design limit by physical isolation of the active battery material, directly mitigating all downstream risks. In one embodiment, the closed-loop adaptive control operations performed by control circuit 150A are implemented during both charge and discharge cycles.

As set forth by the examples illustrated in FIGS. 3(A)/3(B) and 5(A)/5(B), the adaptive current collector arrangements utilizing "central controller" control circuits enable coordinated control over all battery regions to facilitate adjusting localized currents to adjust for current/temperature conditions that are lower than or exceed the design threshold (target value), regardless of the cause. By adapting the performance of all battery regions to keep their respective current portion contributions within their design performance bands, protecting against both safety risks and cell-to-cell imbalances, ACE systems of the present invention facilitate the production of self-sufficient battery assemblies that eliminate the need for most overhead systems.

Figure 6A:
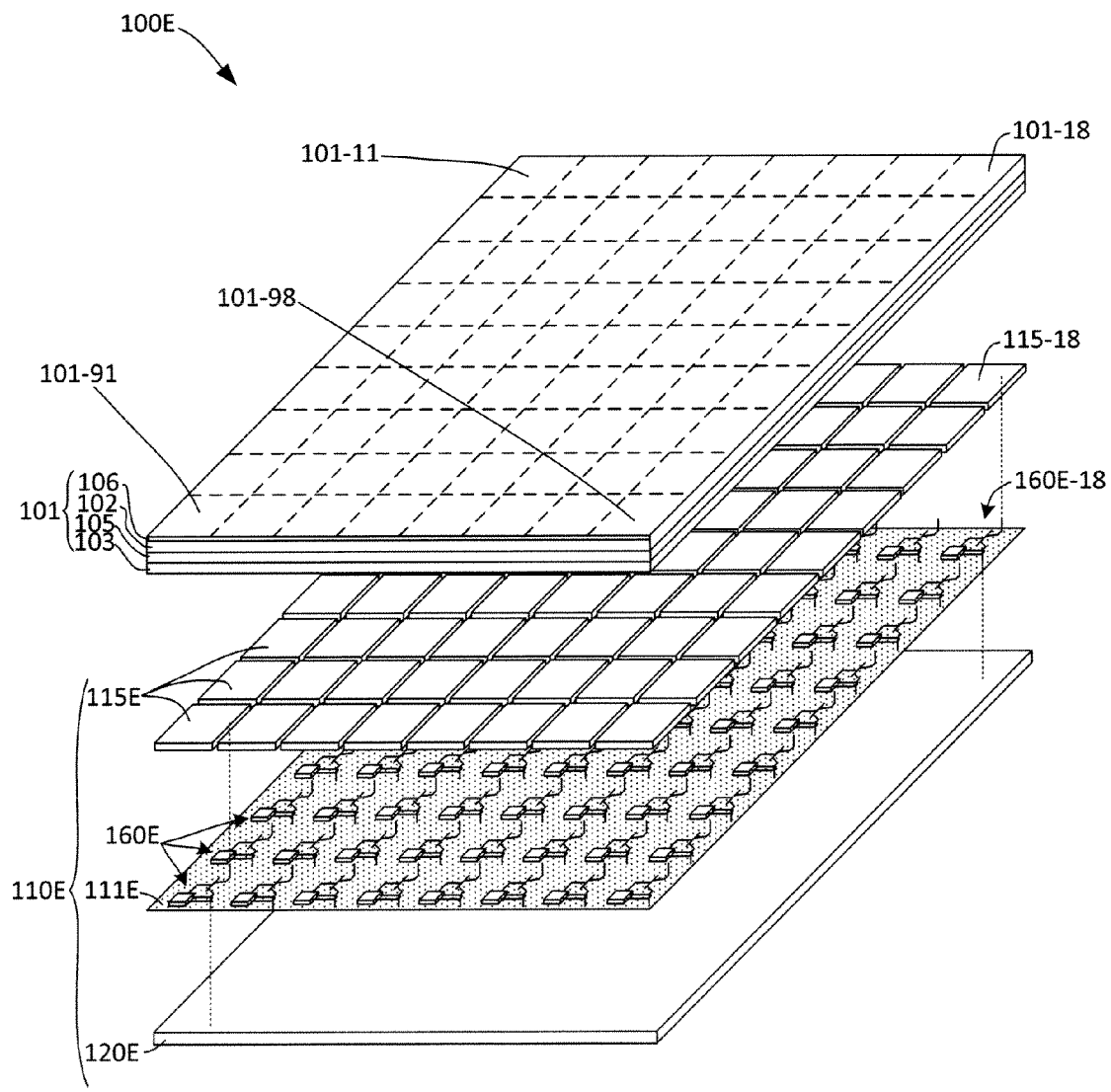
FIG. 6(A) is an exploded perspective view showing a battery assembly including an ACE system according to another embodiment of the present invention.
Figure 6B:
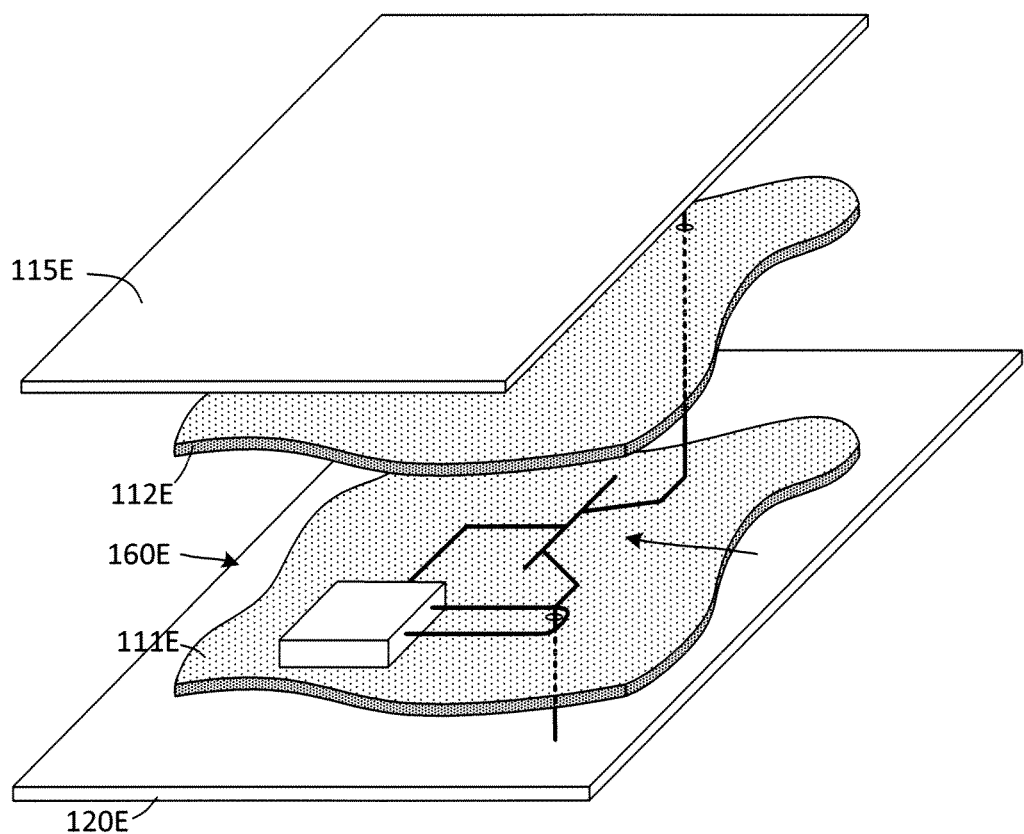
FIG. 6(B) is an enlarged partial exploded perspective view showing a portion of the ACE system of FIG. 6(A)

FIGS. 6(A) and 6(B) are exploded perspective views showing a battery assembly 100E according to a practical embodiment in which ACE system 110E is constructed using thin film electronics. Battery 101 includes anode 102, cathode 103, electrolyte region 105, and anode current collector plate 106. ACE system 110E includes an array of "stand-alone" control/sensor units 160E disposed on a flexible thin film (e.g., plastic) substrate 111E, an array of array of spaced-apart contact pads 115E disposed over substrate 111E, and a collection plate 120E disposed under substrate 111E. Each control/sensor unit 160E is connected by conductive traces to an associated thin film transistor, which is connected between an associated contact pad 115E and collection plate 120. For example, referring to FIG. 6(B), control/sensor unit 160-18 is connected by conductive traces to associated bipolar-type thin film transistor 131E-18, which has an emitter terminal connected by a first metal via structure to contact pad 115E-18, a collector terminal connected by a second metal via structure extending through an insulating layer 112E to current collection substrate 120E, and a control (base) terminal connected to receive a control voltage from control/sensor unit 160E-18. Control/sensor unit 160-18 is an integrated circuit including both circuitry for measuring the current passing through transistor 131E-18, and processing circuitry for generating the control voltage applied to the bases terminal of transistor 131E-18 using a "stand-alone" control logic scheme similar to that described above, whereby control/sensor unit 160E-18 controls the localized current portion flowing from contact pad 115E-18 to current collection substrate 120E. Referring again to FIG. 6(A), in this way, control/sensor unit 160E-18 controls discrete battery region 101-18 of battery 101, and the remaining control/sensor units 160E individually control discrete battery regions 101-11 to 101-98 of battery 101. By using the thin film fabrication approach illustrated in FIGS. 6(A) and 6(B), ACE system 110E is made approximately the same thickness as a conventional aluminum foil, and serves as a substrate for cathode coating to integrate into conventional manufacturing processes.

Figure 7:
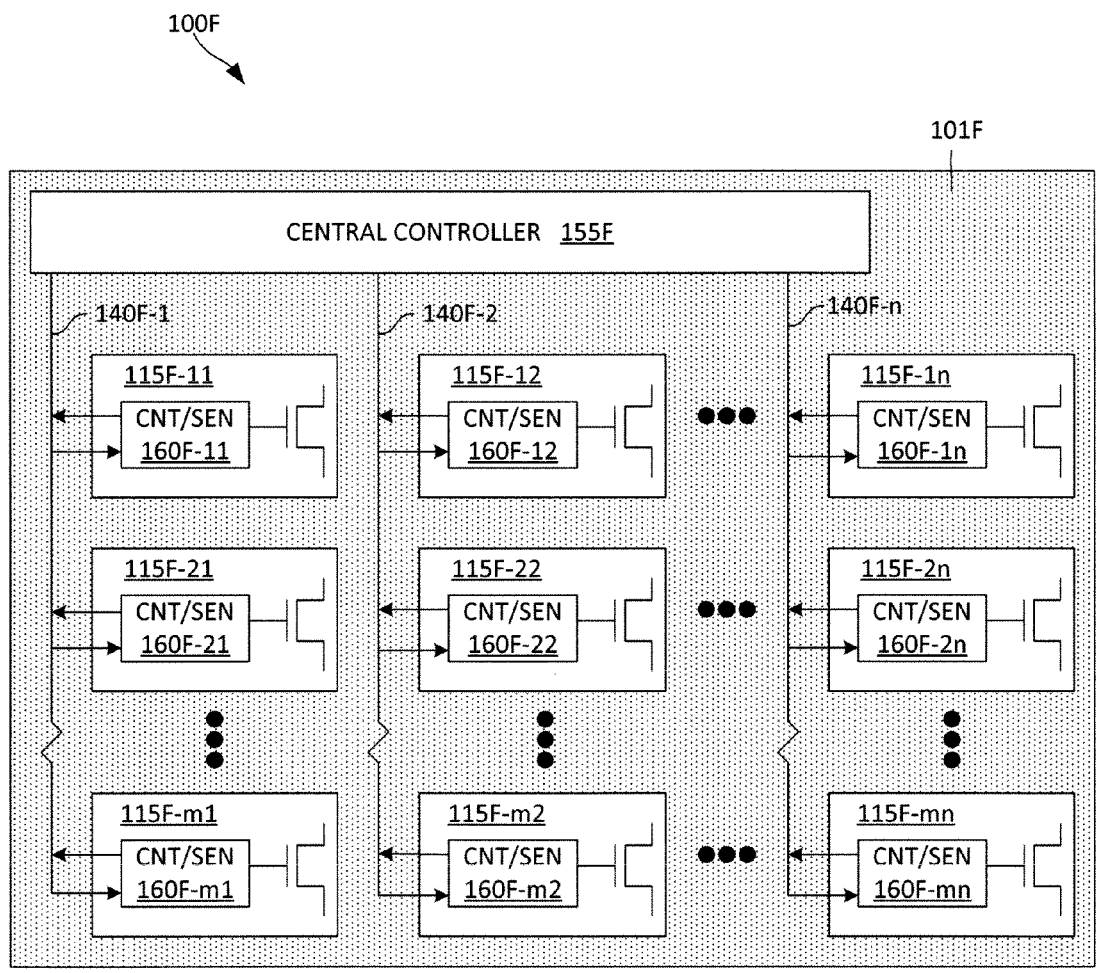
FIG. 7 is a simplified block diagram showing an ACE system according to another embodiment of the present invention.

FIG. 7 is a simplified block diagram showing an ACE system 110F according to another exemplary embodiment. Similar to the previous embodiment, ACE system 110F is fabricated on a flexible thin film (e.g., plastic) substrate 111F and includes an array of control/sensor (CNT/SEN) units 160E-11 to 160E-mn and associated thin film transistors that are connected to corresponding contact pads 1155-11 to 115F-mn using the techniques described above. ACE system 110F differs from the previous embodiment in that it also includes a central controller 155F configured to communicate with control/sensor units 160E-11 to 160E-mn by way of bus lines 140E-1 to 140E-n. Central controller 155F implements control logic that combines features of the "stand-alone" and "central controller" logic schemes described above in that each control/sensor units 160E-11 to 160E-mn controls an associated region of a battery (not shown) using the "stand-alone" logic scheme, but also transmits alarm signals (e.g., sensor or other signals) to central controller 155F by way of bus lines 140E-1 to 140E-n. This arrangement allows central controller 155F to update and transmit operating specifications to each control/sensor unit 160E-11 to 160E-mn. That is, each control/sensor units 160E-11 to 160E-mn sets the conductance of its associated transistor based on stored target specification values (e.g., a target current flow value) transmitted from central controller 155F, and utilizes its own "local" sensor measurements to adjust the localized current flow as needed. If the battery region controlled by a particular control/sensor unit exceeds a stored alarm limit (e.g., the current or temperature are too high), then control/sensor units 160E-11 to 160E-mn are configured to shut down the failed battery region and to send an appropriate signal to central controller 155F. Central controller 155F is then able to permanently shut down battery regions adjacent to the damaged battery region and make adjustments to the specifications sent to other control/sensor units, thereby providing parallel sensing and control redundancy and robustness with graceful degradation characteristics, acting as a failsafe that provides open circuit isolation of the active material in damaged battery regions.

Figure 8:
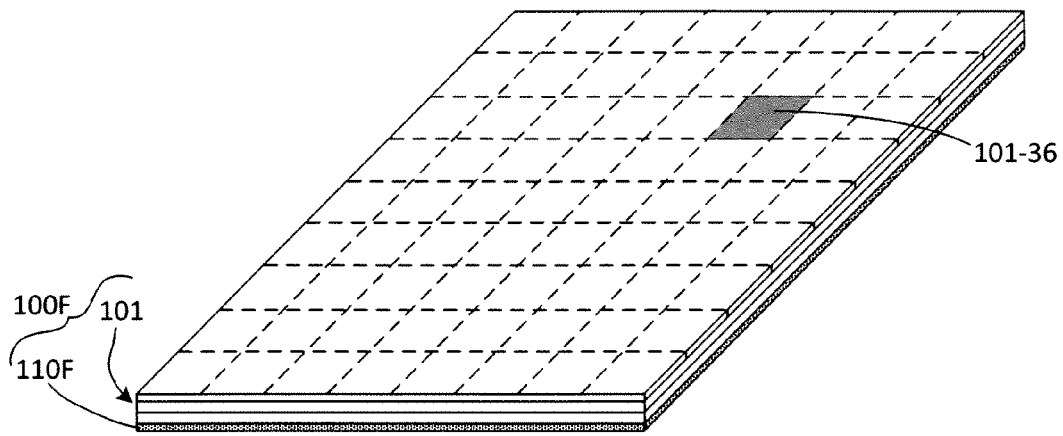
FIG. 8 is a perspective view showing a battery assembly including the ACE system of FIG. 7 during a first operating period.
Figure 9:
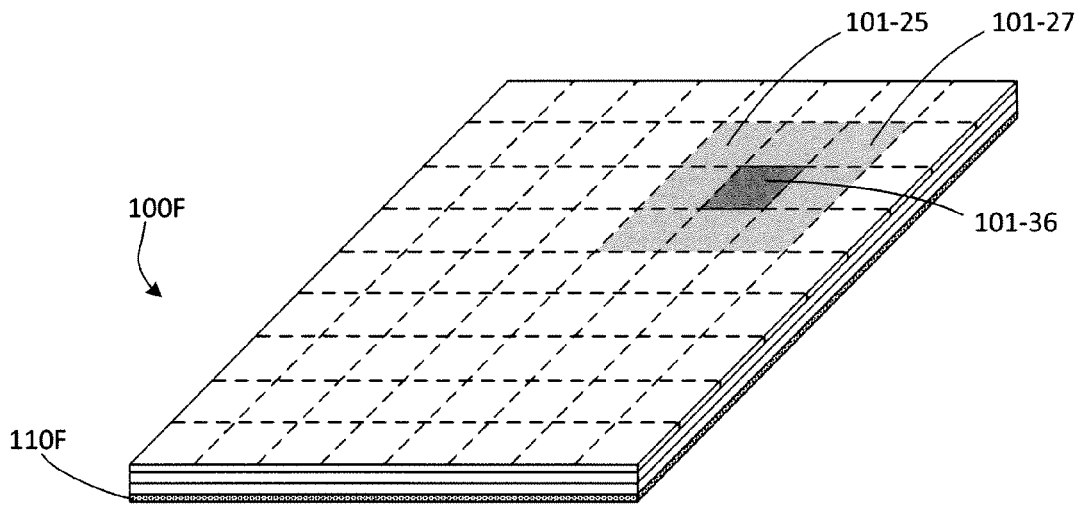
FIG. 9 is a perspective view showing a battery assembly including the ACE system of FIG. 7 during a second operating period.
Figure 10:
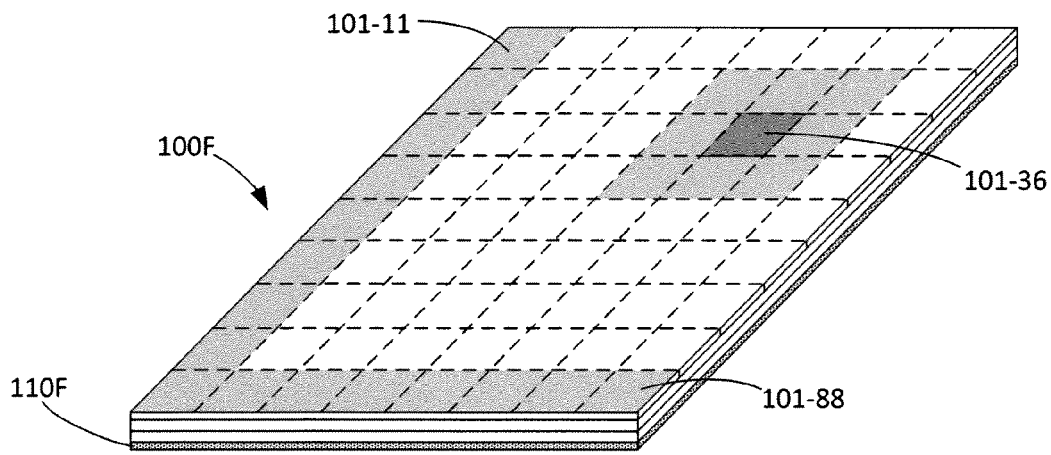
FIG. 10 is a perspective view showing a battery assembly including the ACE system of FIG. 7 during a third operating period.

FIGS. 8-10 illustrate operation of a battery assembly 100F that includes a battery 101 similar to that described above with reference to FIG. 6(A), and using ACE system 110F, which is described above with reference to FIG. 7. In this example, battery 101 includes sixty-four discrete battery regions (indicated by dashed lines) that are accessed by ACE system 110F using the methods described above. Referring to FIG. 8, battery assembly 100F is shown after a discrete battery region 101-36 has failed, which is detected by the associated local control/sensor unit (e.g., by way of measured out-of-range current or temperature). The associated control/sensor unit terminates current generation in failed battery region 101-36 (e.g., by applying a "0V" control signal to the transistor controlling battery region 101-36, which is indicated by dark shading), and transmits a control signal to central controller 155F (shown in FIG. 7). Subsequently, as indicated in FIG. 9, central controller 155F transmits specifications to adjacent control/sensor units that reduces current flow in selected battery regions surrounding failed region 101-36 (e.g., battery regions 101-25 and 101-27, indicated by light shading) in order to minimize possible catastrophic failure. In one practical example, these safety actions including decreasing power output from these surrounding battery regions by 20%, resulting in 4% reduction of power generated by battery 101. FIG. 10 illustrates battery assembly 100F after central controller 155F implements a compensation scheme in which additional control signals are transmitted to the control/sensor units controlling peripheral battery regions (e.g., battery regions 101-11, 101-88 and the intervening battery regions indicated by the L-shape shaded area in FIG. 10), whereby current generation is increased in each of these battery regions by 17%, whereby the total battery output power level of battery 101 is restored to full power.

While the ACE system of the present invention will necessarily add marginal cost and decrease volumetric energy density at the cell level, its dramatic impact on the balance of an EV battery system has the potential to offset this cost several times over. Additional cost advantages are possible through reduced battery material purity and fabrication control requirements because the ACE system provides an ability to compensate for minor manufacturing defects. Ongoing EV battery system analysis indicates the potential to achieve an approximately 25% reduction in weight and cost using the system of the present invention.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A battery assembly comprising:
   a battery including an anode, a cathode, and an electrolyte configured to generate localized currents between said anode and said cathode in a plurality of battery regions, wherein both said anode and said cathode comprise continuous sheet-like structures that define an electrode contact area, wherein each of said plurality of battery regions comprises a discrete region of said electrode contact area such that each said localized current passes through an associated portion of said electrolyte disposed between a corresponding portion of said anode and a corresponding portion of said cathode; and
   an adaptive current-collector electrochemical system configured to control current flow between the battery and a load circuit, the adaptive current-collector electrochemical system including:
   a plurality of contact pads attached to one of said anode and said cathode such that each contact pad of said plurality of contact pads is attached to one of said corresponding anode portion and said corresponding cathode portion of a corresponding said battery region, whereby said associated localized current in said corresponding battery region flows through said each contact pad;
   a current collection substrate;
   a plurality of transistors, each said transistor having a first terminal connected to an associated contact pad, a second terminal connected to the current collection substrate, and a control terminal;
   a plurality of sensors, each sensor being configured to measure an operating parameter of each of said plurality of battery regions, and configured to generate a plurality of first sensor signals having values that are determined by said measurements, and a controller configured to process said first sensor signals, and configured to generate a plurality of control voltages such that each said control voltage has a voltage level that is determined by at least one of said first sensor signals, wherein each said control voltage is applied on the control terminal of an associated said transistor such that a localized current portion passing from an associated said contact pad through said associated transistor to said current collection substrate is proportional to said control voltage.

2. The battery assembly of claim 1, wherein said plurality of sensors comprises a plurality of current sensors, each said current sensor being configured to generate an associated said first sensor signal in accordance with a measured localized current portion flowing between the first and second terminals of an associated said transistor.

3. The battery assembly of claim 2, wherein said controller comprises a plurality of stand-alone control circuits disposed in a spaced-apart arrangement corresponding to an arrangement of said plurality of battery regions, wherein each said stand-alone control circuit is disposed adjacent to and connected to an associated said current sensor of only one associated battery region and is configured to compare one of said first sensor signals with a stored target current flow value, and to adjust an associated said control voltage in accordance with said comparison.

4. The battery assembly of claim 2, wherein said controller comprises a central controller configured to receive said first sensor signals from all of said plurality of current sensors, configured to adjust the plurality of control voltages in accordance with said received first sensor signals, and configured to transmit one of said plurality of control voltages to the control terminal of each of said plurality of transistors.

5. The battery assembly of claim 1, wherein said plurality of sensors comprises a plurality of temperature sensors, each said temperature sensor being configured to generate an associated said first sensor signal in accordance with a measured localized localized temperature of said corresponding battery region.

6. The battery assembly of claim 5, wherein said controller comprises a plurality of stand-alone control circuits disposed in a spaced-apart arrangement corresponding to an arrangement of said plurality of battery regions, wherein each said stand-alone control circuit is disposed adjacent to and connected to an associated said temperature sensor of only one associated battery region and comprises is configured to compare one of said first sensor signals with a stored target temperature value, and to adjust an associated said control voltage in accordance with said comparison.

7. The battery assembly of claim 5, wherein said controller comprises a central controller configured to receive said first sensor signals from all of said plurality of temperature sensors, configured to adjust the plurality of control voltages in accordance with said received first sensor signals, and configured to transmit one of said plurality of control voltages to the control terminal of each of said plurality of transistors.

8. The battery assembly of claim 1, wherein each of said plurality of transistors comprises a power MOSFET.

9. The battery assembly of claim 1, wherein each of said plurality of transistors comprises a bipolar transistor.

10. The battery assembly of claim 1, wherein the plurality of transistors are disposed in an array on a thin film substrate.

11. The battery assembly of claim 1, wherein said controller comprises:
a plurality of local control circuits, wherein each said control circuit is configured to compare one of said first sensor signals with a stored target current flow value, and configured to adjust an associated said control voltage in accordance with said comparison; and
a central controller configured to communicate with said plurality of local control circuits, and configured to transmit updated target current values to each of the plurality of local control circuits.

12. The battery assembly of claim 11, wherein said central controller is further configured to identify a defective battery region of said plurality of battery regions, and configured to terminate said associated localized current in said defective battery region by turning off an associated said transistor coupled to said defective battery region.

13. The battery assembly of claim 12, wherein said central controller is further configured to identify a plurality of proximate said battery regions disposed adjacent to said defective battery region, and configured to reduce said associated localized current in said plurality of proximate battery regions by adjusting the control voltage applied on the control terminal of associated transistors coupled to said plurality of proximate battery regions.

14. The battery assembly of claim 12, wherein said central controller is further configured to identify a plurality of distal said battery regions disposed away from said defective battery region and said proximate battery regions, and configured to increase said associated localized current in said plurality of distal battery regions by adjusting the control voltage applied on the control terminal of associated transistors coupled to said plurality of distal battery regions.

15. An adaptive current-collector electrochemical system for controlling current flow between a battery and a load circuit, the battery including an anode, a cathode, and an electrolyte configured to generate a plurality of localized currents between said anode and said cathode, wherein both said anode and said cathode comprise continuous sheet-like structures that define an electrode contact area including a plurality of discrete battery regions arranged such that each said localized current is generated in an associated said battery region, the system comprising:
a plurality of contact pads attached to and arranged in a spaced-apart configuration on one of said anode and said cathode, each contact pad of said plurality of contact pads being coupled to a corresponding said battery region such that said associated localized current generated in said corresponding battery region flows through said each contact pad;
a current collection substrate; and
a plurality of transistors, each said transistor having a first terminal connected to an associated said contact pad and a second terminal connected to the current collection substrate;
a plurality of sensors, each said sensor being configured to measure an operating parameter of a corresponding said battery region, and being configured to generate a first sensor signal having a value set in accordance with said measurement, and
a control circuit configured to generate a plurality of control voltages, each said control voltage having a voltage level determined by at least one of said first sensor signals, wherein each said control voltage controls an associated said transistor such that a localized current portion passing from said associated contact pad through said associated transistor to said current collection substrate is determined by said each control voltage.

16. The system of claim 15, wherein said plurality of sensors comprises a plurality of current sensors, each said current sensor being configured to generate an associated said first sensor signal in accordance with a measured localized current portion flowing between the first and second terminals of an associated said transistor.

17. The system of claim 16, wherein said control circuit comprises a plurality of local control circuits, wherein each said local control circuit is connected to an associated said current sensor and is configured to compare one of said first sensor signals with a stored target current flow value, and configured to adjust an associated said control voltage in accordance with said comparison.

18. The system of claim 16, wherein said control circuit comprises a central controller configured to receive said first sensor signals from said plurality of current sensors, configured to adjust the plurality of control voltages in accordance with said received first sensor signals, and configured to transmit one of said plurality of control voltages to the control terminal of each of said plurality of transistors.

19. The system of claim 15, wherein said plurality of sensors comprises a plurality of temperature sensors, each said temperature sensor being configured to generate an associated said first sensor signal in accordance with a measured localized localized temperature of said corresponding battery region.

20. A method for controlling current flow between a battery and a load circuit, the battery including an anode, a cathode, and an electrolyte configured to generate a plurality of localized currents in a plurality of battery regions, wherein both said anode and said cathode comprise continuous sheet-like structures that define an electrode contact area, wherein each of said plurality of battery regions comprises a discrete region of said electrode contact area such that each said localized current is generated in an associated portion of said electrolyte disposed between corresponding portions of said anode and said cathode, the method comprising:

disposing a plurality of contact pads in a spaced-apart configuration on one of said anode and said cathode such that each contact pad of said plurality of contact pads receives an associated said localized current generated in a corresponding battery region;

measuring a localized operating parameter in each of the plurality of battery regions using a plurality of stand-alone control circuits disposed in a spaced-apart arrangement corresponding to an arrangement of said battery regions such that each said stand-alone control circuit is disposed adjacent to and connected to an associated sensor of only one associated battery region, and generating a plurality of sensor signals in accordance with said measured operating parameters; and controlling the generation of said localized currents in each of the plurality of battery regions by controlling the flow of said plurality of localized currents between said plurality of contact pads and said load circuit in accordance with said plurality of sensor signals.

* * * * *